G. H. HOWARD.
Railway Cars.
No. 148,825. Patented March 24, 1874.
FIG. I.
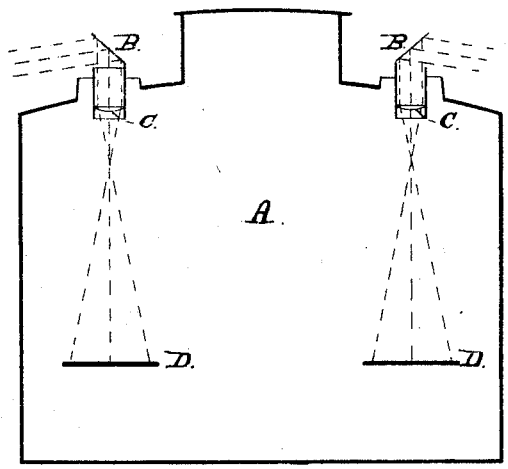
FIG. II.
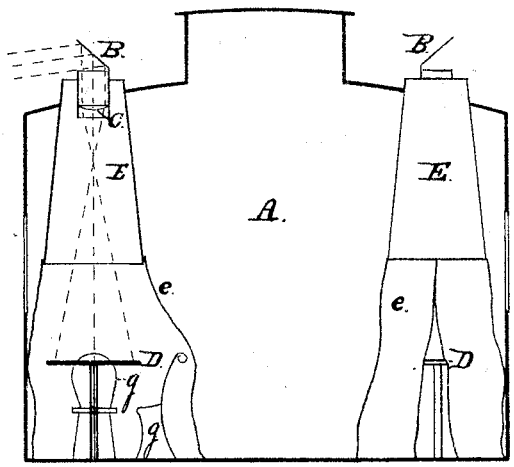
FIG. III.
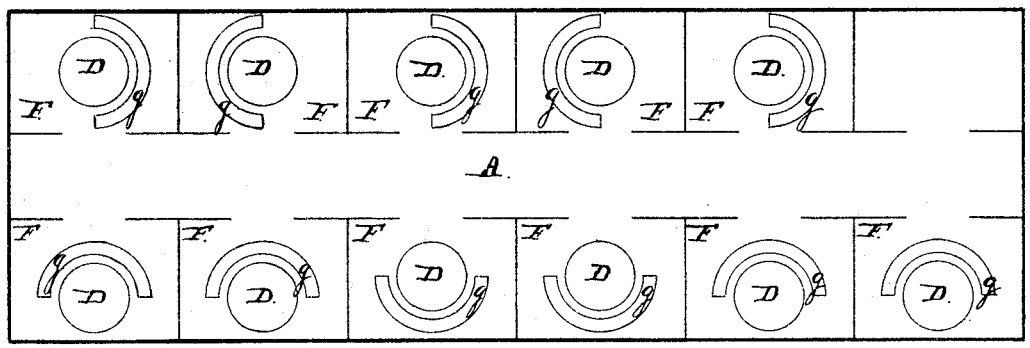
WITNESSES  
Harry Coleman  
Thos. Jewell
INVENTOR  
George Henry Howard

UNITED STATES PATENT OFFICE.

GEORGE H. HOWARD, OF WASHINGTON, DISTRICT OF COLUMBIA.

IMPROVEMENT IN RAILWAY-CARS.

Specification forming part of Letters Patent No. 148,825, dated March 24, 1874; application filed May 6, 1873.

*To all whom it may concern:*

Be it known that I, GEORGE HENRY HOWARD, of the city of Washington, District of Columbia, have invented certain Improvements in Railroad-Cars, of which the following is a specification:

My invention relates to the adaptation of an optical apparatus to a railroad-car, enabling the passengers therein to have presented to them, upon horizontal, vertical, or inclined object-surfaces, an ever-changing representation of the landscape of the country through which the train is passing.

The entire car may be converted into the darkened chamber, in which the image of the external objects is formed by the aid of the mirror and lens; or a chamber or series of chambers may be applied to a car, into which the light is admitted as usual, and the chamber or chambers darkened and the image depicted therein upon a surface visible to the passenger or passengers looking into the chamber or chambers.

The object to be attained can be reached in a variety of ways. By the simplest and most common method of producing such optical effects—viz., by the use of a mirror and convex lens—the representation can be thrown upon a horizontal plane situated in a car or the compartment of a car, or upon the floor of the car or apartment, prepared with a white painted or calendered surface for the purpose; or, by the addition of other mirrors or lenses, or by the interposition of prisms or diaphragms properly adjusted, other effects and appearances may be obtained. For instance, the landscape may be depicted upon prepared surfaces at one or both sides of the car, so as to be visible to passengers seated at either side of the car upon seats or chairs properly and particularly arranged for such a purpose.

Figure 1 represents a vertical section of a darkened car, having at either side thereof the optical apparatus necessary to depict the surrounding landscape upon a horizontal object-surface. Fig. 2 shows a car, into which the light is admitted as usual, having a darkened chamber or chambers, within which the object is depicted. Fig. 3 shows the plan of a compartment-car, to each compartment of which the optical apparatus is applied, depicting the landscape or external object upon a horizontal surface, in front and over which the occupants of the compartment can sit upon seats furnished and properly adjusted for their accommodation.

Similar letters of reference indicate similar parts in all the views.

A is the car. B is the mirror. C is the lens. D is the object-surface.

In Fig. 2 the darkened chambers E E are applied to the car, the spectators sitting partially within the chambers, their forms being concealed and the light excluded by cloaks *e*. In this arrangement, as in the other arrangements herein shown, the horizontal object-surface is used.

In Fig. 3 the compartments are shown by F, and the horizontal object-surface D placed in each, having seats *g* in convenient relation thereto.

I claim as my invention—

In combination with a railroad-car, an optical apparatus for throwing an ever-changing image of the scenery or landscape by or past which the car is passing upon an image or object surface suitably prepared within the car, as set forth.

In testimony whereof I have hereto subscribed my name, in the city of Baltimore, this 30th day of April, 1873.

GEORGE HENRY HOWARD.

Witnesses:
 THOMAS MURDOCH,
 JOSEPH CRAGG.